United States Patent Office 3,549,642
Patented Dec. 22, 1970

---

3,549,642
6,7-DISUBSTITUTED-4-HYDROXY-QUINOLINE-3-CARBOXYLATES
Robert L. Clark, Woodbridge, and Mu Tsu Wu, Clark, N.J., assignors to Merck & Co., Inc., Rahway, N.J., a corporation of New Jersey
No Drawing. Filed Jan. 15, 1969, Ser. No. 791,514
Int. Cl. C07d *33/48*
U.S. Cl. 260—287      5 Claims

ABSTRACT OF THE DISCLOSURE

Novel quinoline-3-carboxylates are provided which are useful in combatting the poultry disease coccidiosis and also malaria. Specific compounds are substituted with an alkoxy having 2–18 carbon atoms, or an aralkoxy group at the 6-position, and a substituted alkyl group at the 7-position.

---

This invention relates to new chemical compounds. More specifically, it relates to novel quinoline-3-carboxylates useful in combating the poultry disease coccidiosis and also malaria. Still more specifically, it is directed to lower-alkyl 6-alkoxy or aralkoxy-7-substituted alkyl-4-hydroxy-quinoline-3 - carboxylates, intermediates therefor and their method of preparation. It is also concerned with the use of the carboxylates as coccidiostats and antimalarials and novel anticoccidial and antimalarial compositions containing them.

Coccidiosis is a widespread poultry disease involving the invasion of caecal and intestinal mucosa by coccidia, specifically protozoan parasites of the genus Eimeria. The most important of these species are *E. maxima, E. acervulina, E. tenella, E. necatrix, E. brunetti, E. praecox* and *E. Mitis*. When left untreated, the severe form of the disease leads to poor weight gain, reduced feed efficiency, reduced egg production and high mortality. For these reasons, the control of coccidiosis is highly important to the poultry industry.

Malaria is a serious parasitic infection normally transmitted by the bite of an infected anopheles mosquito, although it may also be produced by transfusion of blood from an infected donor. It is found most frequently in the tropics and in some tropical areas is hyperendemic. In man it is caused most frequently by the parasites *Plasmodium falciparum, P. vivax* and *P. malariae*. The acute phase of the disease is characterized by shaking chills, high fever, sweats and headache. With malaria due to *P. vivax* and *P. malariae* the patient frequently suffers relapse because of the ability of these parasites to harbor in liver cells for extended periods of time. In view of the recurrent nature of the disease, chemotherapy is used not only to treat the acute phases, but also on an extended basis as a prophylactic or suppressive therapy. Although there are now available synthetic chemicals for the treatment of malaria, the search has continued for new and/or improved antimalarials and for compounds effective against strains of plasmodia resistant to currently available agents.

According to the present invention, it has been found that certain 7-substituted alkyl - 4 - hydroxy - quinoline-3-carboxylates are highly effective in the treatment and prevention of coccidiosis and malaria. An object of this invention, therefore, is to provide new chemical compounds useful in the control of coccidiosis and malaria. A further object is to provide novel compounds useful as intermediates in preparing the coccidiostats and antimalarials. Another object is to provide novel compositions containing the active compounds. A still further object is provision of methods of making such compounds and compositions. An additional object is provision of methods of combatting coccidiosis by administering to poultry minor amounts of the anticoccidial substances described herein. Another object is provision of methods of combatting malaria by administering minor amounts of the antimalarials described herein. Further objects will become evident from the following discussion of the invention.

In accordance with the present invention, it has now been found that compounds represented by the structural Formula I posses significant anticoccidial and antimalarial activity.

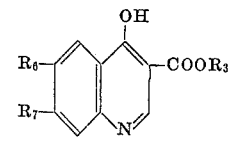

Where $R_3$ is loweralkyl, $R_6$ is alkoxy having 2–18 carbon atoms and aralkoxy, and $R_7$ is alkoxyalkyl, alkylaminoalkyl, dialkylaminoalkyl, or aminolkyl.

The substituent $R_3$ on the above formula represents methyl, ethyl, propyl, butyl, isobutyl and the like. $R_6$ represents an alkoxy group, such as methoxy, ethoxy, propoxy, isopropoxy, butoxy, isobutoxy, decyloxy, or octadecyloxy group, or an aralkoxy group such as benzyloxy or phenethyloxy and the like.

A significant feature of the anticoccidial and antimalarial compounds of this invention is the substituent at the 7-position ($R_7$) of the quinoline carboxylates defined by Formula I above. $R_7$ represents a substituted alkyl which is alkoxyalkyl, alkylaminoalkyl, dialkylaminoalkyl, or aminoalkyl.

For example, $R_7$ can represent diethylaminoethyl, ethoxymethyl, methoxymethyl, di - n - propylaminoethyl, ethylaminomethyl, aminoethyl, n-propoxymethyl, methylaminomethyl, i-butylaminopropyl, aminobutyl and others.

As illustrative of the compounds of this invention there may be mentioned:

methyl 4-hydroxy-6-decyloxy-7-diethylaminomethyl-quinoline-3-carboxylate,
ethyl 4-hydroxy-6-decyloxy-7-ethoxymethyl-quinoline-3-carboxylate,
methyl 4-hydroxy-6-isobutoxy-7-methoxymethyl-quinoline-3-carboxylate,
ethyl 4-hydroxy-6-benzyloxy-7-diethylamino-methyl-quinoline-3-carboxylate,
methyl 4-hydroxy-6-isobutoxy-7-diethylaminomethyl-quinoline-3-carboxylate,
methyl 4-hydroxy-6-n-propyl-7-methoxymethyl-quinoline-3-carboxylate,
methyl 4-hydroxy-6-decyloxy-7-ethoxymethyl-quinoline-3-carboxylate,
methyl 4-hydroxy-6-benzyloxy-7-diethylaminomethyl-quinoline-3-carboxylate,
methyl 4-hydroxy-6-isopropoxy-7-dimethylaminoethyl-quinoline-3-carboxylate, methyl 4-hydroxy-6-n-propoxy-7-diethylaminomethyl-
quinoline-3-carboxylate,
methyl 4-hydroxy-6-ethoxy-7-di-n-propylaminomethyl-
quinoline-2-carboxylate,
methyl 4-hydroxy-6-isobutoxy-7-ethoxymethyl-quinoline-
3-carboxylate,
ethyl 4-hydroxy-6-ethoxy-7-ethylaminomethyl-quinoline-
3-carboxylate,
propyl 4-hydroxy-6-methoxy-7-aminomethyl-quinoline-
3-carboxylate,
methyl 4-hydroxy-6-ethoxy-7-i-butylaminopropyl-
quinoline-3-carboxylate,
ethyl 4-hydroxy-6-benzyloxy-7-amiobutyl-quinoline-3-
carboxylate, and
propyl 4-hydroxy-6-n-propoxy-7-methylaminomethyl-
quinoline-3-carboxylate.

The quinoline-3-carboxylates defined by Formula I above are prepared by treating a 3—$R_7$—4—$R_6$ aniline (where $R_6$ and $R_7$ are as previously defined) with a diloweralkyl loweralkoxy methylene malonate and heating the intermediate obtained thereby.

This reaction may be represented as follows:

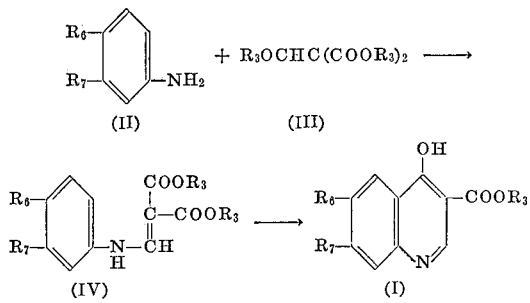

where $R_3$, $R_6$, and $R_7$ are as earlier defined.

In the first step of the above synthesis, a substituted aniline of Formula II above is treated with a diloweralkyl loweralkoxy methylene malonate of Formula III in a solvent. Solvents such as alcohols, e.g. loweralkanols such as ethanol and isopropanol, ethers such as diethylether, dioxane, diethylene glycol dimethylether, ethylene glycol dimethylether, and the like are useful in this regard. The reactants are preferably present in a molar ratio of 1:1 but this may vary somewhat without substantial adverse effect on the quantity of acrylate (IV) to be obtained. This reaction may be carried out at 40°–120° C. but temperatures in the range of 80°–100° C. are preferred.

The acrylate may then be converted to the quinoline-3-carboxylate by treatment with heat. Temperatures of from 200° C.–300° C. are satisfactory with 240° C.–260° C. being preferred. Although not essential to the success of this process, it is preferred that a solvent be employed to better satisfy heat transfer requirements and to improve the yield of product. Solvents which might be used in this regard include dimethylsulfone, dodecylbenzene, biphenyl, diphenylether, and other similar high-boiling solvents.

In accordance with another aspect of the invention, the novel quinoline-3-carboxylates described according to Formula I above are prepared by esterifying the corresponding quinoline-3-carboxylic acid. This provides an additional method for preparing the novel carboxylates which is at times more readily performed than that earlier described. This process is effected by treated the acid with a strong concentrated mineral acid such as phosphoric acid, hydrochloric acid, sulfuric acid, and the like, and an appropriate loweralkanol. The temperature should be maintained at about 75°–150° C., conveniently at about 100° C. for several hours. The remaining alkanol may be removed in vacuo and the residue is worked up by conventional techniques such as neutralization, solution and crystallization.

According to still another method of the present invention, the compounds of Formula I are preparable from the corresponding guinoline-3-carboxylic acid halide. The acid halide is treated with a loweralkanol, e.g. methanol, at 40–160° C. The reaction mixture may then be filtered. The carboxylate product is obtained by cooling the filtrate. Solution, recrystallization, charcoal treatment, and the like may be used in purification of this material.

In accordance with an additional aspect of this invention, there are prepared 7-substituted 4-hydroxy-quinoline of the formula:

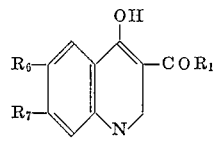

where $r_1$ represents hydroxy and halo and $R_6$ and $R_7$ are as earlier defined. The quinoline-3-carboxylic acids are obtainable from the compounds of Formula I by heating the latter with dilute sodium hydroxide and adding the resulting mixture to mineral acid in alcohol, e.g. hydrochloric acid in methanol. The acid chlorie is derived from the acid by, for example, treatment with thionyl chloride at about 80° C.

The 3-substituted alkyl 4-substituted aniline starting materials of this invention are prepared according to known methods. For example, an anliline starting material having an alkylaminoalkyl group at the 3-position and an alkoxy group at the 4-position is prepared from a 2-aminoalkyl-4-acetamido phenol by treating said phenol as a metallic phenoxide with an alkyl halide, preferably at 90–100° C., using the Williamson synthesis. The compound obtained is then hydrolyzed in acid solution to form the 3-aminoalkyl-4-alkoxy aniline. Many of the alkyl halides, or preferably alkyl bromides are commercially available.

The starting materials having an alkoxyalkyl group as the substituent in the 3-position can be prepared from a substituted phenol, having an alkyl halide substituent in the 3-position, by reacting the alkyl halide with an alcohol to form the ether linkage. The alkyl halide is substituted onto the ring structure through the alkyl-part of the molecule.

According to the present invention, it has been found that the compounds of Formula I above are highly effective for the treatment or prevention of coccidiosis. For this purpose, they are administered to poultry as a component of the feed or drinking water.

Alhough every carboxylate within the purview of this invention does not have the same degree of anticoccadial efficacy, all are active. The amount of active agent necessary for adequate control of the disease will vary with the severity of infection, the duration of treatment and, as indicated above, the particular compound employed as the coccidiostat.

It is one aspect of this invention to provide novel compositions in which the compounds defined by Formula I are present as the active anticoccidial ingredient. Such compositions comprise the quinoline-3-carboxylates intimately dispersed in or admixed with an inert carrier or diluent. By an inert carrier is meant one that is essentially nonreactive with the active anticoccidial ingredient and that may be administered with safety to the animals. In the case of solid compositions, the carrier or diluent is preferably one that is orally ingestible and that is or may be an ingredient of the animal feed. Preferred drinking water formulations are water soluble powders, aqueous suspensions, or solutions.

The compositions which are one of the preferred features of the invention are feed supplements in which the active anticoccidial ingredient is present in relatively large amounts in a poultry feed additive. Diluents which are normally employed for these animal feed supplements are solid orally ingestible poultry feed additives such as distillers' dried grains, corn meal, citrus meal, crushed limestone, and the like. The diluents preferred have nutritive value to the poultry and are normal ingredients of the finished feed. These supplements are incorporated in the poultry feed either directly or in an intermediate dilution or blending step. These premixes or feed supplements may contain about 5–50% by weight of the active ingredient.

Examples of typical feed supplements containing a quinoline-3-carboxylate of this invention are as follows:

| | Lbs. |
|---|---|
| (A) Methyl 4-hydroxy-6-decyloxy - 7 - diethylaminomethyl quinoline-3-carboxylate | 20 |
| Corn Meal | 80 |
| (B) Methyl 4-hydroxy-6-isobutoxy-7-methoxymethyl-quinoline-3-carboxylate | 30 |
| Distillers' dried grains | 70 |

Finished feeds may be a mesh containing ground grain, animal and vegetable proteins, mineral and vitamin concentrates, or it may be a broiler feed containing a large proportion of ground yellow corn together with other nutritive substances such as fish meal, soybean oil meal, meat products, minerals and vitamins. Feed levels of drug of from about 0.0005% to about 0.2% by weight are effective in controlling coccidiosis, with concentrations of about 0.003% to 0.05% by weight of feed being preferred. It should be understood that the higher feed levels within these ranges may be employed when using the compounds therapeutically for relatively short periods of time whereas lower feed levels are useful when the compounds are used prophylactically. It is desirable to employ the lowest levels that afford adequate control of the disease to minimize risk of side effects that might appear on prolonged feeding of the compounds. When the active agents are administered by way of the drinking water, somewhat lower levels than those in feed will be satisfactory since the birds drink about twice as much as they eat. The use of the active agents in drinking water is made more practically useful by addition to the water of a suspending agent such as acacia, tragacanth, Veegum (colloidal magnesiumaluminum silicate, R. E. Vanderbilt Co.), carboxypolymethylene, algins, methylcellulose, hydroxyethylcellulose and others, which promotes even distribution of the water-insoluble material.

One or more of the quinoline-3-carboxylates defined by Formula I may be used as the sole active agent or it may be used in conjunction with other coccidiostats. Such mixtures may be used for the purpose of utilizing the primary effectiveness of each compound against a particular species of coccidia. It has now been found that the present compounds are highly effective against $E.$ $brunetti$ and $E.$ $tenella$. See Table I for specific activities of the compounds. For the purpose of producing a broad spectrum coccidiostat composition, these 4-hydroxy-quinoline-3-carboxylates may accordingly be admixed with a compound highly efficacious in treating another variety of the disease.

TABLE I.—COCCICIOSIS ACTIVITY

Compound:

$R_6$——OH, ——COOR$_3$
$R_7$——N

| | | | Dose level, percent by weight in feed to give control of disease | |
|---|---|---|---|---|
| $R_3$ | $R_6$ | $R_7$ | $E.$ brunetti | $E.$ tenella |
| CH$_3$ | Decyloxy | Diethylaminomethyl | 0.0008 | 0.0015 |
| CH$_3$ | ---do--- | Ethoxymethyl | | 0.0125 |
| CH$_3$ | Isobutoxy | Diethylaminomethyl | 0.006 | 0.025 |
| CH$_3$ | ---do--- | Ethoxymethyl | 0.003 | 0.0125 |

In employing these loweralkyl 4-hydroxy-6,7-disubstituted quinoline carboxylates as antimalarials, the compounds are preferably administered orally. Oral dosage forms such as capsules, tablets or powders in which the drug is intimately admixed with a non-toxic solid pharmaceutically acceptable carrier or diluent vehicle are preferred. However, liquid formulations such as syrups, suspensions or elixirs may be used if desired. The compounds may also be administered parenterally or intravenously in which case they may be formulated as a solution or suspension in sterile physiologic saline.

Unit dosage forms such as tablets or capsules of varying strengths may be prepared, either scored or unscored, using carriers, diluents, other excipients and formulating techniques known to those skilled in this particular art.

In accordance with the invention a composition is provided in which a quinoline of Formula I above is the primary antimalarial ingredient, and in which it is supported or suspended in a solid, substantially non-toxic pharmaceutical carrier such as lactose, sucrose, starch and/or mannitol together with other excipients commonly used in the preparation of tablets such as stearic acid, magnesium stearate, gelatin and/or acacia. Known stabilizing, binding, disintegrating, flavoring, coloring and lubricating agents may be employed as desired.

These solid unit dosage forms are conveniently prepared to contain from about 5–500 mg. of quinoline of Formula I since this permits adjustment of dosage regimens by administration where necessary of more than one tablet or capsule. It should also be understood that such dosage forms, as well as the other compositions of the invention may also contain one or more of other antimalarial agents such as chloroquine, primaquine and chloroguanide.

In addition to solid compositions, the compounds of the invention may be administered via oral liquid compositions such as aqueous suspensions or elixirs containing suitable dispersing, suspending or flavoring agents, or administered parenterally in physiological saline or an oleaginous vehicle.

The preferred dose level for controlling malaria in humans of the novel quinoline-3-carboxylates of Formula I above is from about 10–2000 mg. per day. As will be understood and appreciated by those skilled in this art, the preferred or optimal dose will depend to some extent upon the species of malaria being treated, the type of treatment being used, i.e. prophylactic or therapeutic, and the particular quinoline-3-carboxylate employed. Selection of optimum dose is made without difficulty by a clinician skilled in this art. For example, treatment of acute attacks requires higher and more frequent doses whereas in suppressive or prophylactic therapy lower doses are used but over a longer period of time. When methyl 4-hydroxy-6-decycloxy-7-diethylaminomethyl-quinoline-3-carboxylate, methyl 4 - hydroxy-6-decyloxy-7-ethoxymethylquinoline-3-carboxylate, methyl 4-hydroxy-6-benzyloxy-7-diethylaminomethyl-quinoline-3-carboxylate, or methyl 4-hydroxy-6-isobutoxy-7-methoxymethyl-quinoline-3-carboxylate, four of the preferred compounds of this invention, are used against falciparum malaria, oral doses of about 100–1000 mg./day for 1–10 days give good result in treating an acute attack; for preventive therapy the regimen is continued for up to two weeks after the acute stage. Similar treatment is useful against acute attacks of vivax and malariae malaria, but with these strains the prophylactic or suppressive therapy is continued for a much longer period of time.

The antimalaria activity of the compounds of this invention is determined using a sensitive rodent strain of malaria $Plasmodium$ $berghei$ since extension of survival time in the infected host is evidence of anti-malaria activity in other hosts. The experiment is conducted as follows: groups of 5 mice/group are infected with a lethal dose of $P.$ $berghei$ (normal strain) three days prior to treatment. The compound to be tested is suspended in oil and injected subcutaneously. The mean survival time (MST) of the infected non-medicated animals is 7.0±0.5 days. A compound is therapeutically active when the mean survival time of the treated groups of animals is increased in comparison with the untreated groups. The extension in survival time of the treated mice in the mean survival time of the treated mice minus the mean survival time of the untreated infected controls. The compound under test is considered as curative of the infection when any mice in the treated group survive for 60 days or longer.

Table II below sets forth the results obtained with a group of representative compounds of this invention, the figures representing the extension of survival time (in days) of the treated infected animals over the untreated infected.

The following examples are given for the purpose of illustration and not by way of limitation.

the alcohol under reduced pressure the aniline is extracted with ether. The ether is evaporated and the 7 g. of oil, identified as 4-benzyloxy-3-diethylaminomethyl aniline, is added to 5.2 g. of dimethylmethoxy methylene malonate, and the mixture treated the same as the above decycloxy compound. The resulting product, methyl 4-hydroxy-6-benzyloxy-7-diethylaminomethyl-quinoline - 3 - carboxylate, melts at 244–246° C.

When the above process is carried out and 4-acetamido-2-aminomethyl-phenol or 4-acetamido-2-ethylaminomethyl-phenol is used in place of the 4-acetamido-3-diethylaminomethyl - phenol, methyl 4 hydroxy-6-benzyloxy-7-aminomethyl - quinoline - 3 - carboxylate or methyl 4- hy-

TABLE II $$\text{structure with OH, } R_6, R_7, COOR_3 \text{ on quinoline}$$

| Exp. No. | $R_3$ | $R_6$ | $R_7$ | Dose (mg./kg.) | | | | | | | | |
|---|---|---|---|---|---|---|---|---|---|---|---|---|
| | | | | 2.5 | 5 | 10 | 20 | 40 | 80 | 160 | 320 | 640 |
| 1 | Methyl | Decyloxy | Diethylaminomethyl | | | | (¹) | (¹) | (¹) | (¹) | (¹) | (¹) |
| 2 | do | do | Ethoxymethyl | | | | 7.0 | 7.0 | 7.0 | 7.0 | 7.0 | 7.0 |
| 3 | do | Benzyloxy | Diethylaminomethyl | | | | 0.3 | 0.5 | 0.5 | 3.7 | (¹) | (¹) |
| 4 | do | Isobutoxy | Methoxymethyl | | | | | 0.2 | 0.4 | 0.4 | | |

¹ Cure.

EXAMPLE 1

Methyl 4-hydroxy-6-decyloxy-7-diethylaminomethyl-quinoline-3-carboxylate

To a mixture of 23.6 g. of 4-acetamido-2-diethylaminomethyl-phenol, 200 ml. of dimethyl formamide, and 5.4 g. of sodium methoxide is added, with stirring, 72.2 g. of 1-bromodecane and 10.2 g. of triethylamine. The mixture is heated at 90–100° C. for 24 hours. After cooling the mixture is poured into ice water with vigorous stirring and the solid which separates is crystallized from aqueous ethanol. The resulting 4-decyloxy-3-diethylaminomethyl acetanilide melts at 94–95° C.

19.7 g. of the above substituted acetanilide is heated under reflux with 70 ml. of 6 N hydrochloric acid for 3 hours. After cooling, the solution is poured into ice cold sodium hydroxide. The oil that separates is extracted into chloroform, washed with water and dried over magnesium sulfate. The solvent is removed to yield 4-decyloxy-3-diethylaminomethylaniline, an oil which is used in the next reaction.

To 13 g. of the above aniline is added 7 g. of dimethylmethoxy methylene malonate and the solution heated in the steam bath 3 hours. After evaporating any alcohol that is formed, the residue, methyl α-carbmethoxy-β-(4-decyloxy-3-diethylaminomethyl-anilino)-acrylate, is added to 200 ml. of stirred dodecylbenzene preheated to 245–255° C. under a nitrogen atmosphere. After heating 15 minutes the mixture is cooled and the product, methyl 4 - hydroxy - 6-decyloxy - 7-diethylaminomethyl-quinoline-3-carboxylate, removed by filtration. It is washed with petroleum ether and acetone and melted at 216–218.5° C.

When the above process is carried out and diethylethoxy methylene malonate is used in place of dimethylmethoxy methylene malonate, ethyl 4-hydroxy-6-decycloxy-7-diethylaminomethyl-quinoline-3-carboxylate is obtained.

EXAMPLE 2

Methyl 4-hydroxy-6-benzyloxy-7-diethylaminomethyl-quinoline-3-carboxylate 4-acetamido-2-diethylaminomethyl - phenol is heated with benzylchloride following the same general procedure of Example 1. The resulting 4-benzyloxy-3-diethylaminomethyl acetanilide melts at 127–128° C.

The above acetanilide is hydrolyzed by heating 9 g. in a solution of 16.8 g. of potassium hydroxide in 10 ml. of water and 90 ml. of ethanol for 6 hours. After removing droxy - 6 - benzyloxy - 7 - ethylaminomethyl - quinoline-3-carboxylate are obtained respectively.

When the above process is carried out and isopropyl chloride or hexylchloride is used instead of benzylchloride, methyl 4 - hydroxy-6-isopropoxy-7-diethylaminomethyl-quinoline-3-carboxylate or methyl 4 - hydroxy - 6 - hexyloxy-7-diethylaminomethyl-quinoline-3-carboxylate is obtained.

EXAMPLE 3

Methyl 4-hydroxy-6-decyloxy-7-ethoxymethyl-quinoline-3-carboxylate 18.8 g. of 2-chloromethyl-4-nitrophenol is refluxed in 100 ml. of absolute ethanol in the presence of 20 g. of triethylamine for 20 hours. The solvents are removed in vacuo, water is added to the oil and the product extracted with ether. After washing and drying the ether solution, the ether is removed to give 2-ethoxymethyl-4-nitrophenol. 11.5 g. of this phenol in 100 ml. of dimethyl formamide is treated with 2.7 g. of sodium methoxide followed by 11.1 g. of 1-bromodecane and 5.1 g. of triethylamine. The mixture is then heated at 90–100° for 20 hours The cooled mixture is poured into water, extracted with ether and the ether in turn extracted with 10% sodium hydroxide and washed with water. After drying the ether solution, the ether is evaporated to give an oil. 14.4 g. of the oil is hydrogenated in 150 ml. of methanol using 2 g. of 5% palladium-on-charcoal as a catalyst. The catalyst is removed by filtration and the solvents evaporated to give 3-ethoxymethyl-4-decyloxyaniline.

10.6 g. of this aniline is added to 5.3 g. of dimethylmethoxy methylene malonate and heated on the steam bath for 3 hours. This product, methyl α-carbmethoxy-β-(4-decyloxy - 3 - ethoxymethylanilino)-acrylate, is then added to 300 ml. of dodecylbenzene preheated to 245° and through which a strong stream of nitrogen is bubbled. After 7 minutes heating, the mixture is cooled and a gel-like solid, identified as methyl 4-hydroxy-6-decyloxy-7-ethoxymethyl-quinoline-3-carboxylate, separated which is removed by filtration and washed with petroleum ether and acetone. It is recrystallized from dimethyl formamide and melts at 232–235° C.

EXAMPLE 4

Methyl 4-hydroxy-6-isobutoxy-7-diethylaminomethyl-quinoline-3-carboxylate

Following the same general procedure as in Example 1, 4-acetamido-2-diethylaminomethyl-phenol is heated with isobutylbromide. The resulting 4-isobutoxy-3-diethylaminomethyl acetanilide is then hydrolyzed by heating in an aqueous-ethanolic solution of potassium hydroxide following the procedure of Example 2. After removing the alcohol under reduced pressure, the 4-isobutoxy-3-diethylaminomethyl aniline is extracted with ether. The ether is evaporated, and the aniline is added to dimethylmethoxy methylene malonate. After heating following the procedure of Example 1, the product, methyl 4-hydroxy-6-isobutoxy-7 - diethylaminomethyl - quinoline - 3 - carboxylate is recovered, having a melting point of 235–238° C.

EXAMPLE 5

Methyl 4-hydroxy-6-isobutoxy-7-methoxymethyl-quinoline-3-carboxylate

A mixture of 37.5 g. of 2-chloromethyl-4-nitrophenol, 21.6 g. of sodium methoxide, 20 g. of 3-chloro-2-methyl propene and 600 ml. of methanol is heated in a bomb at 80° for 15 hours. The chlorine is replaced by a methoxy group and the phenol is alkylated by the methallyl group at the same time. The reaction mixture is poured into water and extracted with ether which is then washed with water, and 10% sodium hydroxide. The dried ether is then removed in vacuo to give 3-methoxymethyl-4-methallyloxy-nitrobenzene. It crystallized upon cooling and when recrystallized from aqueous methanol melts at 30–31° C.

A solution of 16.4 g. of the above compound in 200 ml. of methanol is hydrogenated in the presence of 1 g. of 5% palladium-on-charcoal. Both the double bond and the nitro group are hydrogenated and, after removing the catalyst and the solvent, the residue consisting of 3- methoxymethyl-4-isobutoxyaniline is added to 9.6 g. of dimethylmethoxy methylene malonate and heated on the steam bath for 2 hours. This mixture containing methyl α - carbmethoxy - β - (4 - isobutoxy - 3 - methoxymethyl-anilino)-acrylate is added to 200 ml. of dodecylbenzene preheated to 245° C. After 10 minutes the mixture is cooled and the solid separated and recrystallized from dimethyl formamide to give the product, methyl 4-hydroxy-6-isobutoxy-7-methoxymethyl - quinoline - 3 - carboxylate, having a melting point of 265–267° C.

What is claimed is:
1. A compound of the formula:

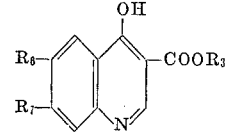

where $R_3$ is loweralkyl; $R_6$ is alkoxy having 2–18 carbon atoms, benzyloxy, or phenethyloxy; and $R_7$ is a substituted loweralkyl selected from loweralkoxyalkyl, loweralkylaminoalkyl, diloweralkylaminoalkyl, or aminoalkyl.

2. A compound according to claim 1 where $R_6$ is decyloxy, and $R_7$ is diethylaminomethyl.

3. A compound according to claim 1 where $R_6$ is decyloxy, and $R_7$ is ethoxymethyl.

4. A compound according to claim 2 where $R_3$ is methyl.

5. A compound according to claim 3 where $R_3$ is methyl.

References Cited

UNITED STATES PATENTS

| | | | |
|---|---|---|---|
| 3,399,203 | 8/1968 | Patchett et al. | 260—287 |
| 3,472,859 | 10/1969 | Lesher et al. | 260—287 |
| 3,496,184 | 2/1970 | Mizzoni et al. | 260—287 |
| 2,614,121 | 10/1952 | Price | 260—287X |
| 3,172,811 | 3/1965 | Kaminsky | 167—65 |
| 3,316,147 | 5/1967 | Watson | 167—53.1 |
| 3,414,576 | 12/1968 | Cairns | 260—287 |
| 3,449,403 | 6/1969 | Patchett et al. | 260—287X |
| 3,463,779 | 8/1969 | Bowie | 260—287 |

DONALD G. DAUS, Primary Examiner

U.S. Cl. X.R.

260—471, 485, 562, 570.8, 578; 424—258